STELLA B. (SITES) NEWCOMER.
FLOUR SIFTER AND MIXER.
APPLICATION FILED APR. 27, 1912.
1,067,366.
Patented July 15, 1913.
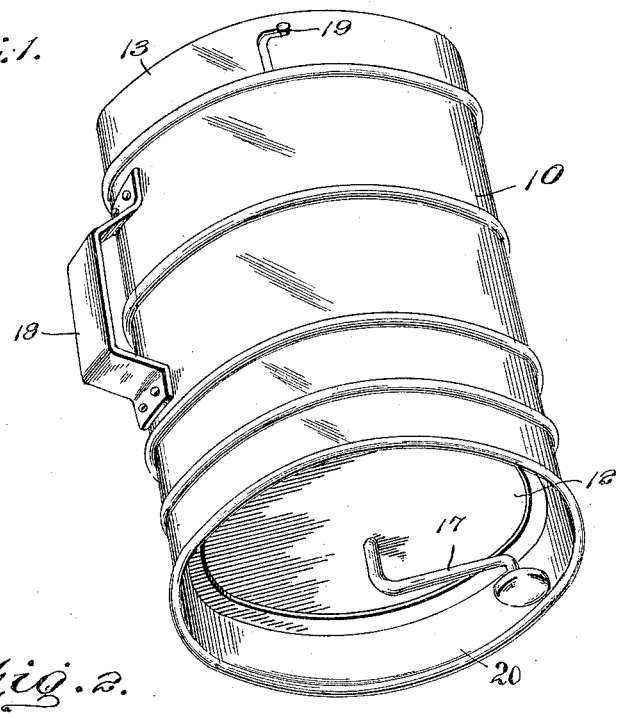
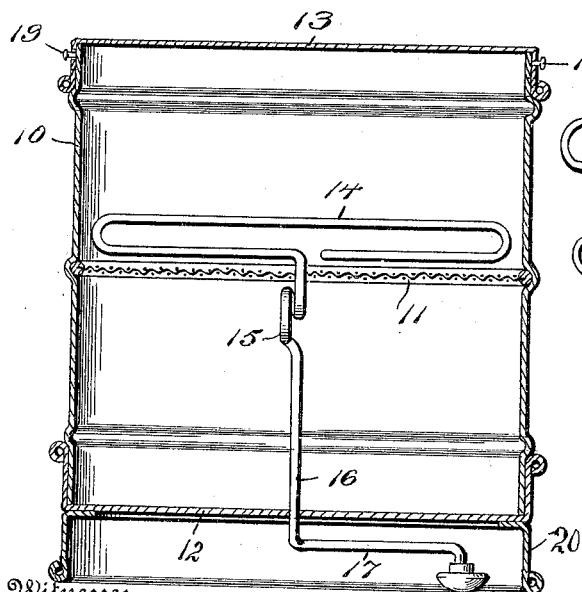
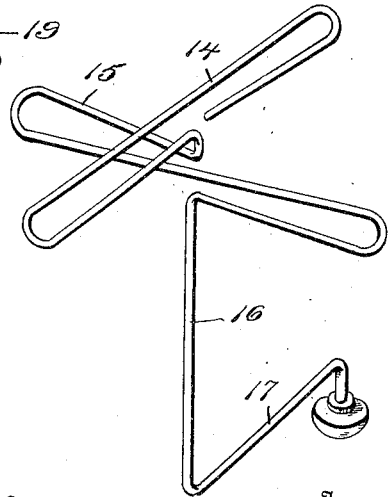

UNITED STATES PATENT OFFICE.

STELLA B. (SITES) NEWCOMER, OF ANGLETON, TEXAS.

FLOUR SIFTER AND MIXER.

1,067,366. Specification of Letters Patent. Patented July 15, 1913.

Application filed April 27, 1912. Serial No. 693,730.

*To all whom it may concern:*

Be it known that I, STELLA B. (SITES) NEWCOMER, citizen of the United States, residing at Angleton, in the county of Brazoria and State of Texas, have invented certain new and useful Improvements in Flour Sifters and Mixers, of which the following is a specification.

This invention relates to improvements in devices for sifting and mixing flour, and has for one of its objects to provide a simply constructed device whereby the flour may be repeatedly sifted and thoroughly mixed without removal from the sifter.

With these and other objects in view, the invention consists in certain novel features of construction as hereafter shown and described, and then specifically pointed out in the claims, and in the drawings illustrative of the preferred embodiment of the invention: Figure 1 is a perspective view from beneath of the improved device; Fig. 2 is a longitudinal sectional view of the same; Fig. 3 is a perspective view of the agitator device.

Corresponding and like parts are referred to in the following description and indicated in all the views of the drawings by the same reference characters.

The improved device is designed for use by housewives to enable flour to be sifted any required number of times and thoroughly mixed without removal from the receptacle, and may be of any required size or capacity.

The improved device comprises a shell or casing 10, preferably cylindrical, and having an interior screen 11 located intermediate its ends. The cylinder 10 is provided with a stationary closure 12 at one end and a detachable closure 13 at the other end, the latter preferably held by bayonet couplings 19 or other suitable fastenings. Located within the screen are two agitator devices 14—15 of any suitable form and disposed at opposite sides of the screen 11 and operating over the same simultaneously and at opposite sides. The agitator devices 14—15 are provided with a stock 16 extending through the closure 12 and terminating in a crank 17. By this simple means it will be obvious that by rotating the stock 16 through the medium of the crank 17, the agitator devices 14—15 will be simultaneously operated upon opposite sides of the screen, and thus force the flour through the same. The casing 10 is provided with a suitable handle 18 at one side whereby the device may be supported when in use. The casing will be of sufficient size to hold the requisite quantity of flour upon either side of the screen 11, and when the device is to be employed, the closure 13 is removed and the flour and other ingredients to be sifted and mixed are deposited within the cylinder 10 upon the screen. The closure 13 is then restored to its position and locked through the medium of the joint 19 and the crank 17 rotated to sift and mix the flour and cause it to pass into the other compartment at the opposite side of the screen. The closure 13 is then removed and the casing carefully tilted to remove any particles too large to pass through the screen and without causing the flour which has been sifted into the lower compartment to escape. The cover 13 is then restored and the cylinder reversed in position and the crank again manipulated to cause the flour to be sifted back again into the other compartment, and then if a greater number of siftings are required, this can readily be accomplished by simply reversing the cylinder after each operation. By this simple means the flour, or the flour and other ingredients may be sifted and mixed any required number of times without removal from the casing.

The casing 10 will be extended below the closure 12 as shown at 20, to form a support for the device in advance of the crank 17.

The agitator devices including the stock 16 and crank 17 may be constructed of any suitable material, but will preferably be formed from a single piece of wire bent into the required shape, as shown.

The loops 14—15 of the agitating devices each contains two members one operating close to the screen and the other spaced a considerable distance from the screen so that the particles of flour are acted upon both in close proximity to the screen and at some distance therefrom, thus insuring a more thorough disintegration of the particles and causing the agitator to pick up any larger lumps which may be present and carry them around over the screen. Arranging the agitator members as shown likewise causes them to carry around with them a relatively large quantity of the matter and thus materially increases the effect of the agitators and materially facilitates the sifting action.

The improved device is simple in construction, can be inexpensively manufactured and of any required capacity.

Having thus described the invention, what is claimed as new is:

1. A flour sifter and mixer comprising a receptacle, a transverse screen intermediate the receptacle, an agitating device formed from a single piece of wire extending through the screen and bent into lateral loops at each side of the screen, each loop including one member operating in close proximity to the adjacent face of the screen and another member spaced from the screen, and means for rotating said agitating device.

2. A flour sifter and mixer comprising a receptacle, a transverse screen intermediate the receptacle, an agitating device formed from a single piece of wire extending through the screen and bent into lateral loops at each side of the screen, each loop including one member operating in close proximity to the adjacent face of the screen and another member spaced from the screen, said agitating device being extended at one end into an operating handle.

In testimony whereof I affix my signature in presence of two witnesses.

STELLA B. (SITES) NEWCOMER. [L. S.]

Witnesses:
W. W. NEWCOMER,
L. B. THOMPSON.

Copies of this patent may be obtained for five cents each, by addressing the "Commissioner of Patents, Washington, D. C."